(12) United States Patent
Sarkis et al.

(10) Patent No.: US 12,452,838 B2
(45) Date of Patent: Oct. 21, 2025

(54) TECHNIQUES FOR USING PHYSICAL RESOURCE BLOCKS (PRBS) IN A SIDELINK RESOURCE POOL

(71) Applicant: QUALCOMM Incorporated, San Diego, CA (US)

(72) Inventors: Gabi Sarkis, San Diego, CA (US); Sudhir Kumar Baghel, Hillsborough, NJ (US); Shuanshuan Wu, San Diego, CA (US); Tien Viet Nguyen, Bridgewater, NJ (US); Kapil Gulati, Belle Mead, NJ (US)

( * ) Notice: Subject to any disclaimer, the term of this patent is extended or adjusted under 35 U.S.C. 154(b) by 0 days.

(21) Appl. No.: 17/225,681

(22) Filed: Apr. 8, 2021

(65) Prior Publication Data

US 2021/0321368 A1    Oct. 14, 2021

Related U.S. Application Data

(60) Provisional application No. 63/008,212, filed on Apr. 10, 2020.

(51) Int. Cl.
| | |
|---|---|
| *H04W 72/02* | (2009.01) |
| *H04B 7/06* | (2006.01) |
| *H04W 28/02* | (2009.01) |
| *H04W 52/02* | (2009.01) |
| *H04W 68/00* | (2009.01) |
| *H04W 72/1263* | (2023.01) |
| *H04W 92/18* | (2009.01) |

(52) U.S. Cl.
CPC ......... *H04W 72/02* (2013.01); *H04B 7/0626* (2013.01); *H04W 28/0278* (2013.01); *H04W 52/0229* (2013.01); *H04W 68/005* (2013.01); *H04W 72/1263* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 10,616,864 B2* | 4/2020 | Sheng | H04W 72/02 |
| 10,785,753 B1* | 9/2020 | Li | H04L 5/0044 |

(Continued)

FOREIGN PATENT DOCUMENTS

| | | | | |
|---|---|---|---|---|
| EP | 3937407 A1 * | 1/2022 | | H04L 1/0026 |
| WO | WO-2020146634 A1 * | 7/2020 | | H04L 1/0067 |

(Continued)

*Primary Examiner* — Anh Vu H Ly

(57) ABSTRACT

Certain aspects of the present disclosure provide techniques for using physical resource blocks (PRBs) of a sidelink resource pool that, in some cases, might not belong to a sub-channel in sidelink or are assigned to a special sub-channel. When a user equipment (UE) is transmitting a sidelink communication, the sidelink communication often takes place in resource pools that include sub-channels in frequency domain and slots in a time domain. A first subset of PRBs of the resource pool may be assigned to one or more sub-channels in the frequency domain. The disclosed methods, devices, and systems provide for identifying PRBs not assigned to the first subset (e.g., remaining or unused PRBs or PRBs assigned to a special sub-channel). In some aspects of the present disclosure, the UE may use these PRBs for various purposes.

30 Claims, 17 Drawing Sheets

(56) References Cited

U.S. PATENT DOCUMENTS

| | | | |
|---|---|---|---|
| 11,317,383 B2* | 4/2022 | Thomas | H04W 4/40 |
| 2020/0029318 A1* | 1/2020 | Guo | H04W 76/14 |
| 2020/0344722 A1* | 10/2020 | He | H04W 72/0446 |
| 2021/0105760 A1* | 4/2021 | Chen | H04L 27/2601 |
| 2021/0176669 A1* | 6/2021 | Fakoorian | H04L 5/0055 |
| 2021/0274536 A1* | 9/2021 | Shin | H04W 72/1257 |
| 2022/0116934 A1* | 4/2022 | Zhang | H04L 1/1861 |
| 2022/0224491 A1* | 7/2022 | Salim | H04L 1/1854 |
| 2022/0232529 A1* | 7/2022 | Lin | H04W 72/02 |
| 2022/0394738 A1* | 12/2022 | Yang | H04L 1/1861 |
| 2023/0062681 A1* | 3/2023 | Hwang | H04W 72/20 |

FOREIGN PATENT DOCUMENTS

| | | | | |
|---|---|---|---|---|
| WO | WO-2020197645 A1 * | 10/2020 | | H04W 72/0406 |
| WO | WO-2021034572 A1 * | 2/2021 | | H04B 7/063 |

* cited by examiner

TECHNIQUES FOR USING PHYSICAL RESOURCE BLOCKS (PRBS) IN A SIDELINK RESOURCE POOL

CROSS-REFERENCE TO RELATED APPLICATION(S)

This application claims benefit of and priority to U.S. Provisional Application No. 63/008,212 filed Apr. 10, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to device-to-device sidelink communication.

Description of the Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, or other resources). Multiple-access technologies can rely on any of code division, time division, frequency division, orthogonal frequency division, single-carrier frequency division, or time division synchronous code division multiple access (TD-SCDMA) systems, to name a few. These and other multiple access technologies have been adopted in various telecommunication standards to provide a common protocol that enables different wireless devices to communicate on a municipal, national, regional, and even global level.

Sidelink communications are communications from one UE to another UE. As the demand for mobile broadband access continues to increase, there exists a need for further improvements in NR and LTE technology, including improvements to sidelink communications. These improvements should be applicable to other multi-access technologies and the telecommunication standards that employ these technologies.

SUMMARY

Certain aspects can be implemented in a method for wireless communication by a first user equipment (UE) for sidelink communication with other UEs. The method generally includes identifying a set of physical resource blocks (PRBs) of a resource pool allocated for sidelink communications between the first UE and at least a second UE, identifying a first subset of PRBs of the resource pool assigned to one or more sub-channels for sidelink communications, identifying a second subset of PRBs of the resource pool not identified in the first subset of PRBs, and using the second subset of the PRBs for sidelink communications.

Certain aspects can be implemented in an apparatus for wireless communication by a UE. The apparatus may include at least one processor and a memory coupled to the at least one processor, the memory including instructions executable by the at least one processor to cause the apparatus to identify a set of PRBs of a resource pool allocated for sidelink communications between the first UE and at least a second UE, identify a first subset of PRBs of the resource pool assigned to one or more sub-channels for sidelink communications, identify a second subset of PRBs of the resource pool not identified in the first subset of the PRBs, and use the second subset of the PRBs for sidelink communications.

Certain aspects can be implemented in an apparatus for wireless communication by a first UE. The apparatus may include means for identifying a set of PRBs of a resource pool allocated for sidelink communications between the first UE and at least a second UE, means for identifying a first subset of PRBs of the resource pool assigned to one or more sub-channels for sidelink communications, means for identifying a second subset of PRBs of the resource pool not identified in the first subset of the PRBs, and means for using the second subset of the PRBs for sidelink communications.

Certain aspects can be implemented in a non-transitory computer-readable medium for wireless communication by a first UE. The non-transitory computer-readable medium may comprise computer-executable instructions that, when executed by one or more processors of a processing system, cause the processing system to identify a set of PRBs of a resource pool allocated for sidelink communications between the first UE and at least a second UE, identify a first subset of PRBs of the resource pool assigned to one or more sub-channels for sidelink communications, identify a second subset of PRBs of the resource pool not identified in the first subset of the PRBs, and use the second subset of the PRBs for sidelink communications.

Certain aspects can be implemented in a computer program product for wireless communication by a first UE embodied on a computer-readable storage medium. The computer-readable storage medium may comprise code for identifying a set of PRBs of a resource pool allocated for sidelink communications between the first UE and at least a second UE, code for identifying a first subset of PRBs of the resource pool assigned to one or more sub-channels for sidelink communications, code for identifying a second subset of PRBs of the resource pool not identified in the first subset of the PRBs, and code for using the second subset of the PRBs for sidelink communications.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for using physical resource blocks (PRBs) in sidelink. When a UE is transmitting a sidelink communication, the sidelink communication often takes place in resource pools that include sub-channels in a frequency domain and slots in a time domain. A first subset of PRBs of the resource pool may be assigned to one or more sub-channels in the frequency domain. In some aspects of the present disclosure, PRBs not assigned to the first subset (e.g., remaining or unused PRBs or PRBs assigned to a special sub-channel) may be used by the UE in one or more ways described herein.

Introduction to Wireless Communication Networks

Figure 1:
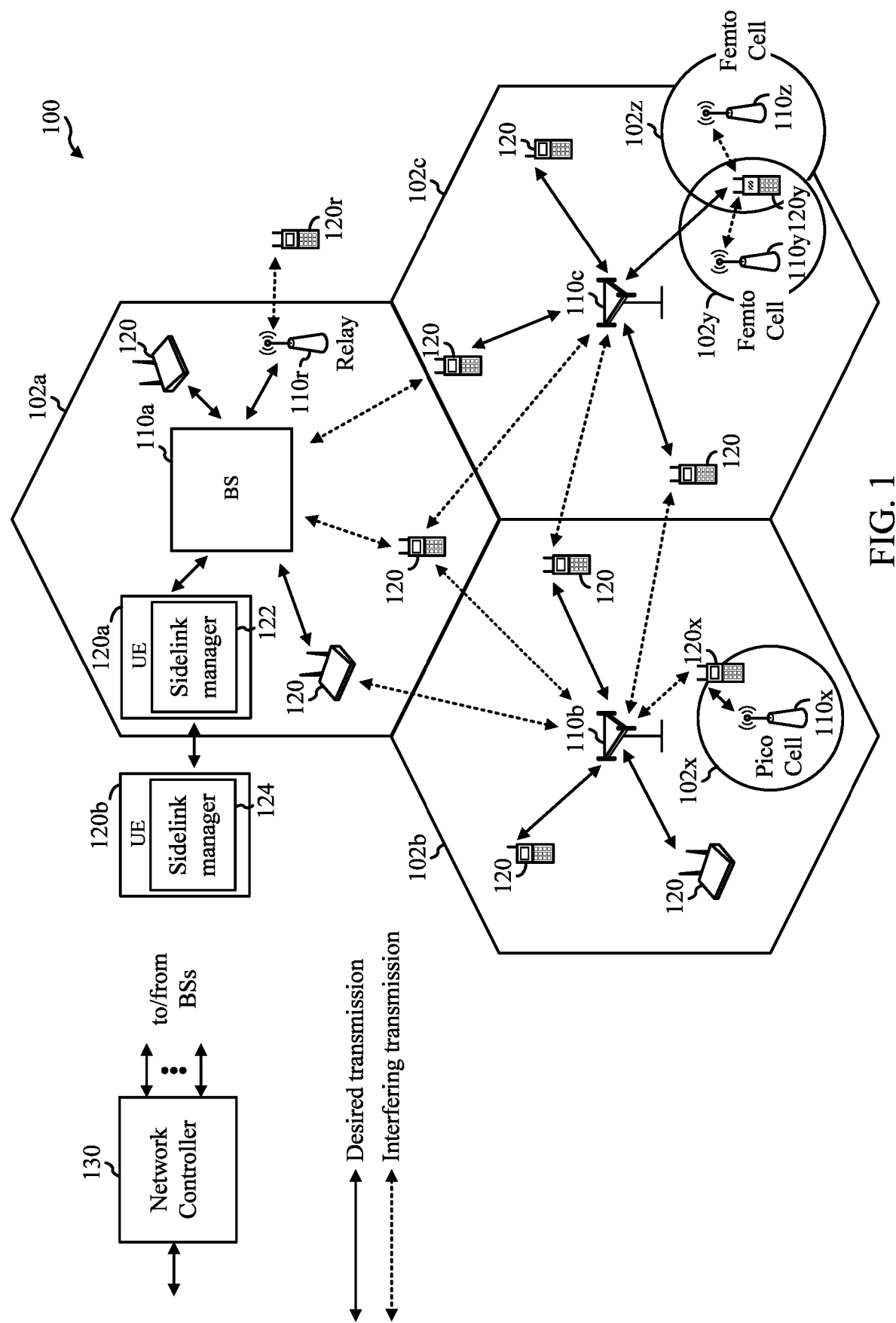
FIG. 1 is a block diagram conceptually illustrating an example telecommunications system, in accordance with certain aspects of the present disclosure.

FIG. 1 illustrates an example of a wireless communication network 100 (e.g., an NR/5G network) in which aspects described herein may be implemented.

For example, a user equipment (UE) 120a, a UE 120b, and/or a base station (BS) 110a of FIG. 1 may be configured to perform operations described below with reference to FIG. 14 to recover a sidelink communication that is missed by a wireless node due to the wireless node transmitting while the sidelink communication is occurring.

As illustrated in FIG. 1, the wireless communication network 100 may include a number of BSs 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to recover a sidelink communication from another UE. As shown in FIG. 1, UE 120a includes a sidelink manager 122 and UE 120b includes a sidelink manager 124. The sidelink managers 122 and 124 may be configured to transmit a sidelink communication to each other or another UE, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
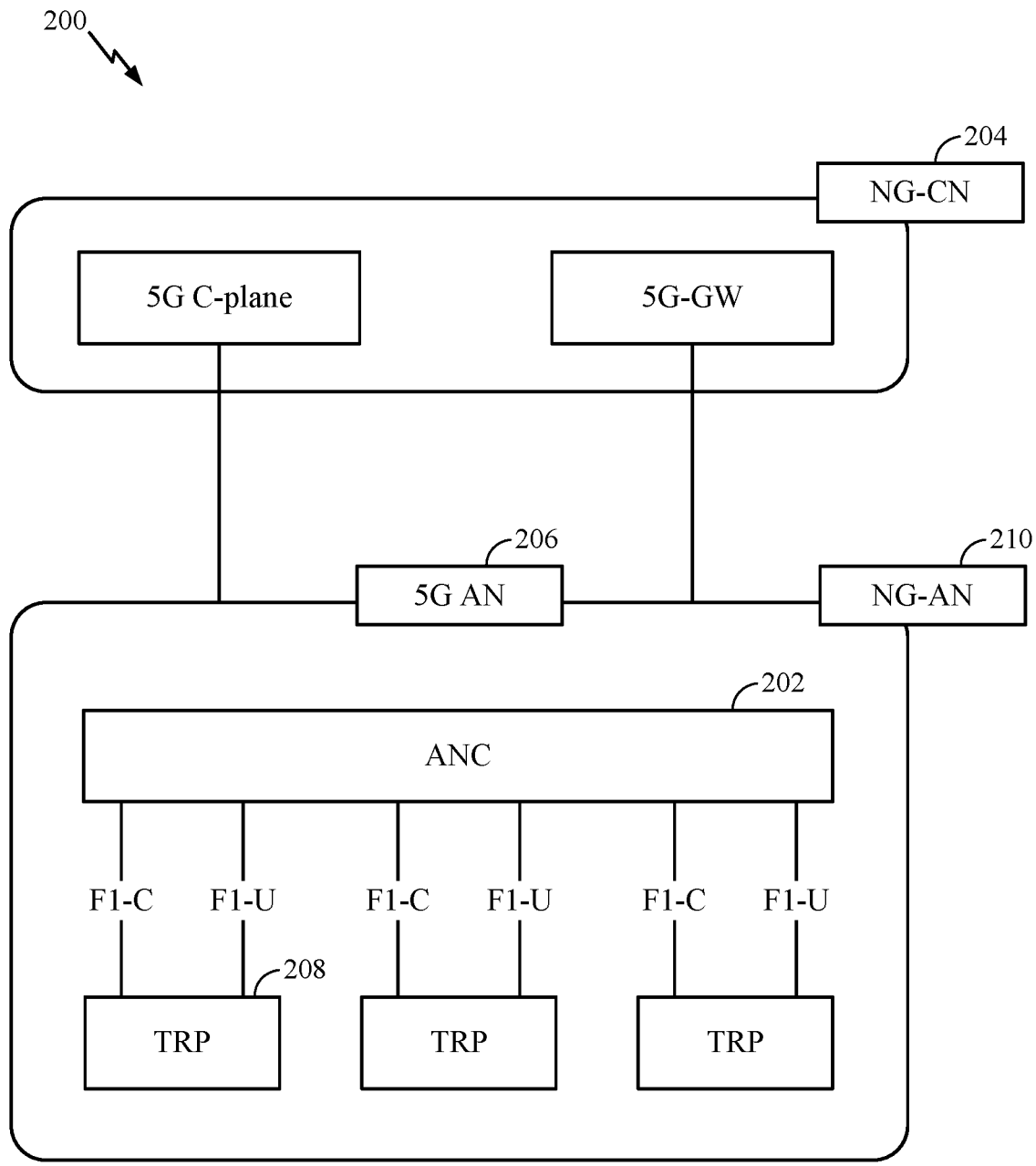
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
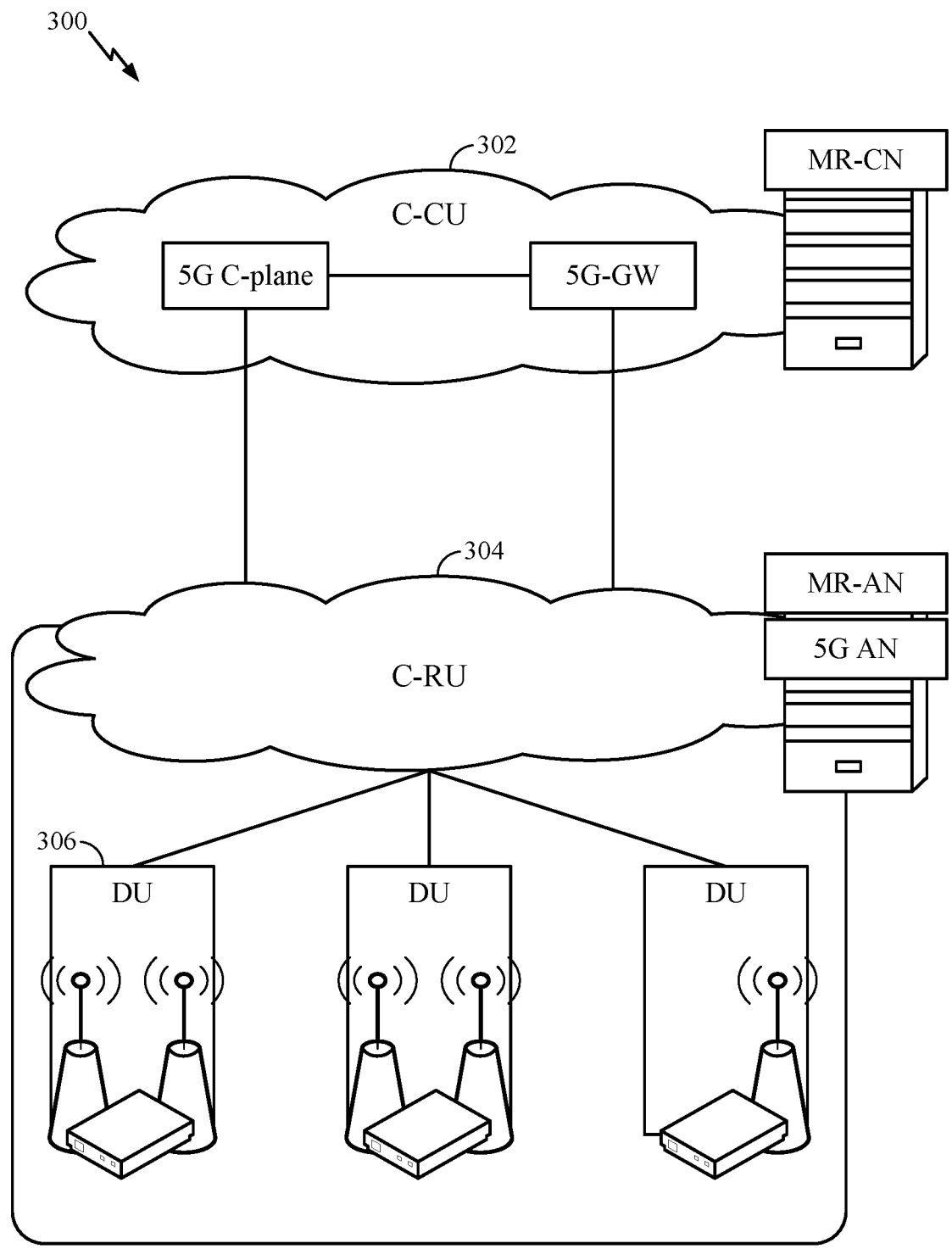
FIG. 3 is a diagram illustrating an example physical architecture of a distributed RAN, in accordance with certain aspects of the present disclosure.

FIG. 3 illustrates an example physical architecture of a distributed RAN 300, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
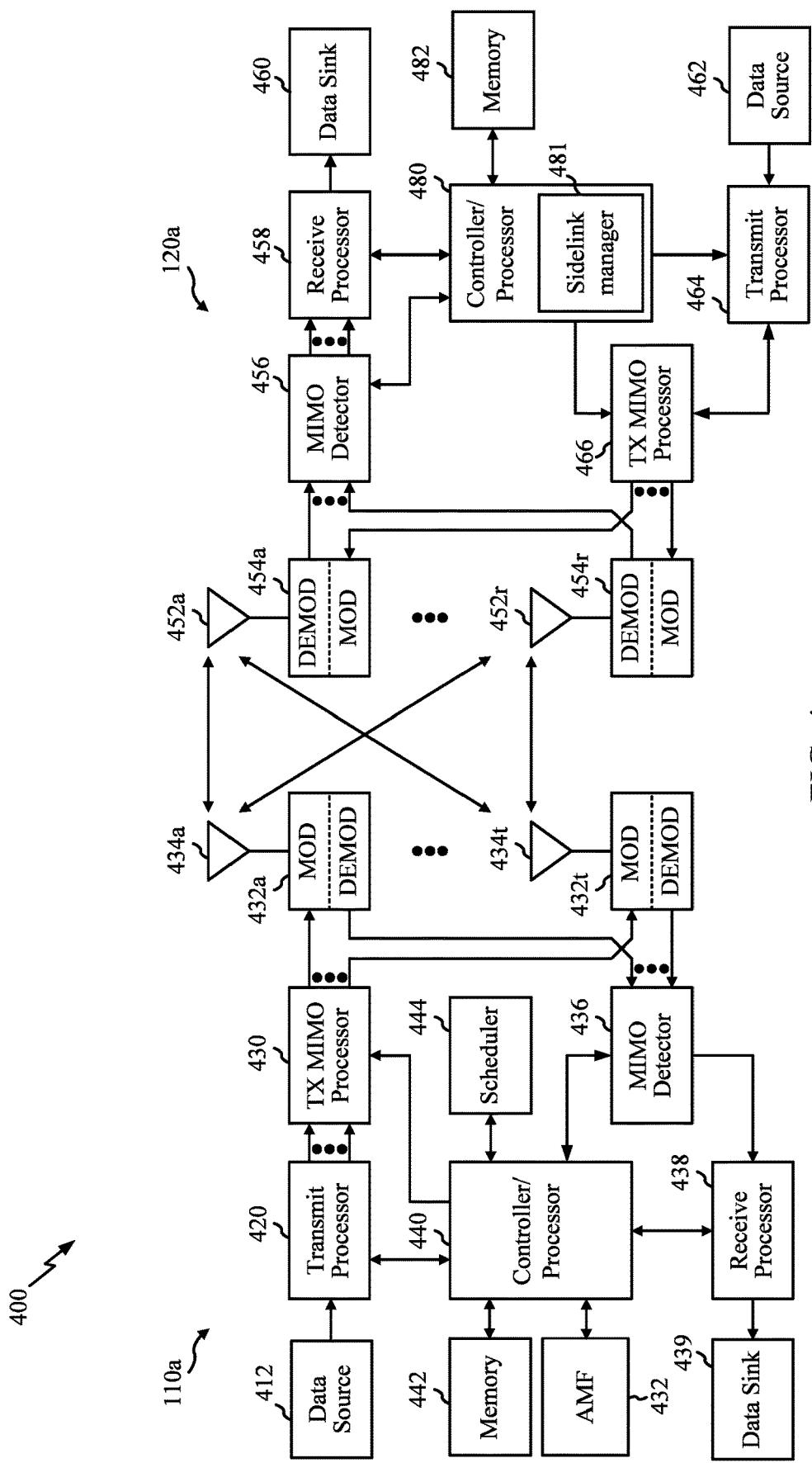
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIG. 14.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the UL, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110a. At the BS 110a, the UL signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a sidelink manager 481 that may be configured for transmitting a sidelink communication to another UE. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the DL, sidelink, and/or UL.

Example Sidelink Communications

While communication between user equipments (UEs) (e.g., UE 120 of FIGS. 1 and 4) and base stations (BSs) (e.g., BSs 110 of FIGS. 1 and 4) may be referred to as the access link, and the access link may be provided via a Uu interface, communication between devices may be referred to as the sidelink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5A:
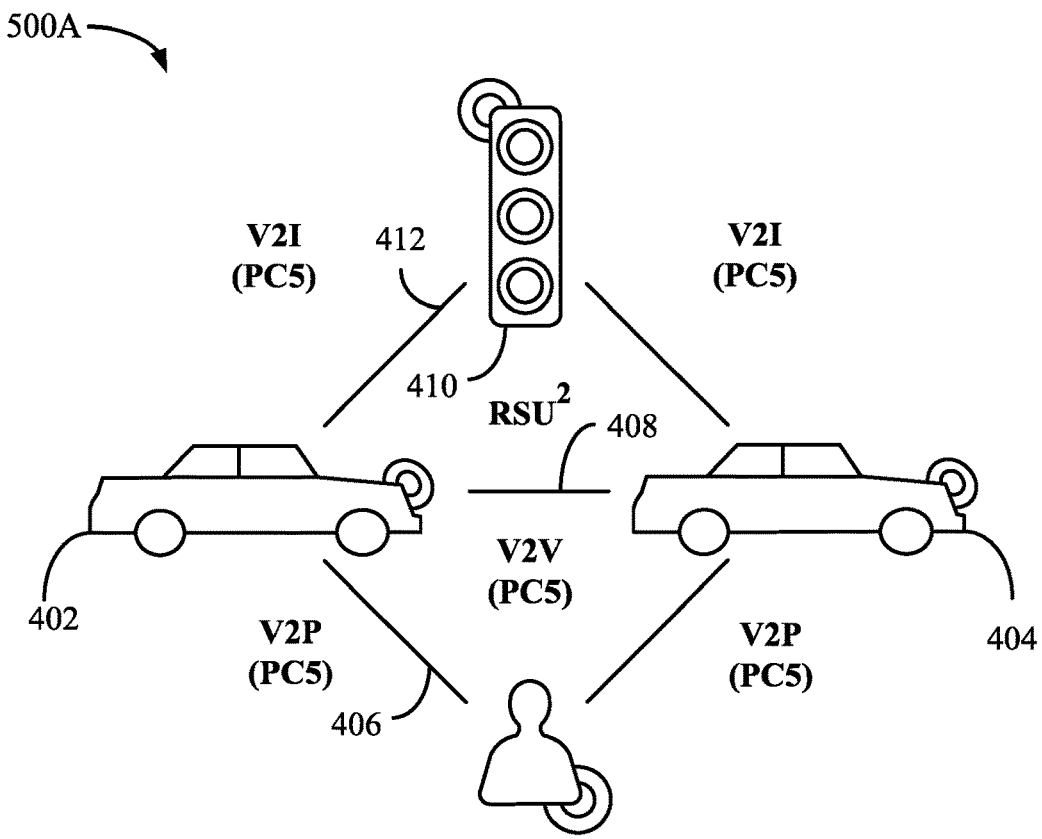
FIGS. 5A and 5B show diagrammatic representations of example vehicle to everything (V2X) systems, in accordance with certain aspects of the present disclosure.
Figure 5B:
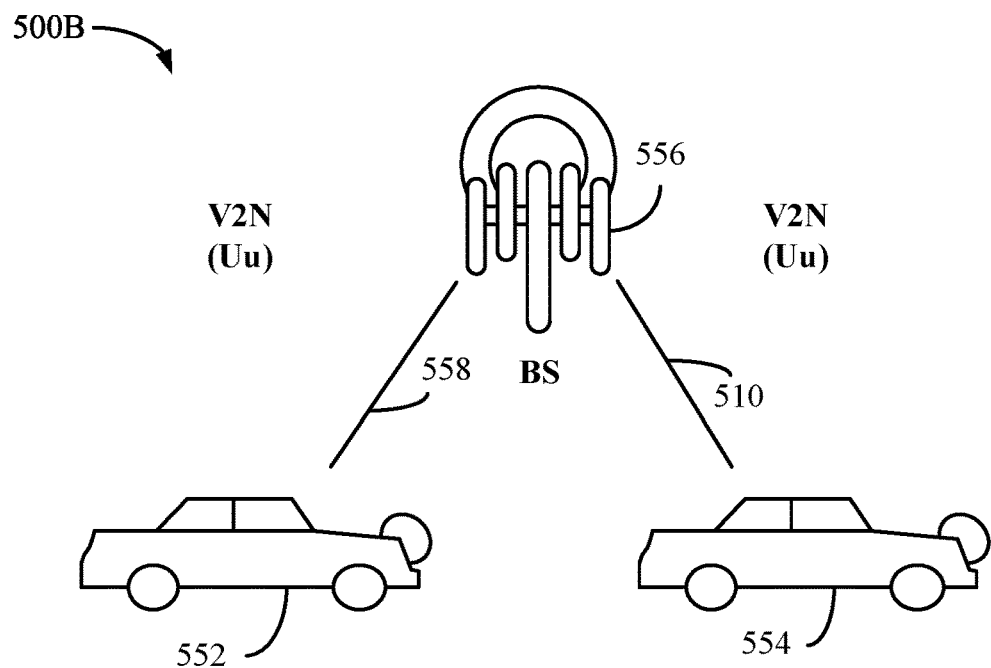

FIGS. 5A and 5B show diagrammatic representations of example vehicle to everything (V2X) systems, in accordance with certain aspects of the present disclosure. For example, the vehicles shown in FIGS. 5A and 5B may communicate via sidelink channels and may perform sidelink channel state information (CSI) reporting as described herein.

V2X systems, provided in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500A (for example, including vehicle-to-vehicle (V2V) communications) is illustrated with two vehicles 502, 504. The first transmission mode may allow for direct communication between different participants in a given geographic location. As illustrated, a vehicle may have a wireless communication link 506 with an individual (i.e., vehicle to pedestrian (V2P)) (for example, via a UE) through a PC5 interface. Communications between vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 500B for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks (WLANs), which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as CSI related to a sidelink channel quality. A sequence-based PSFCH format with one symbol (not including automatic gain control (AGC) training period) may be supported. The following formats may be possible: a PSFCH format based on PUCCH format 2 and a PSFCH format spanning all available symbols for sidelink in a slot.

Figure 6:
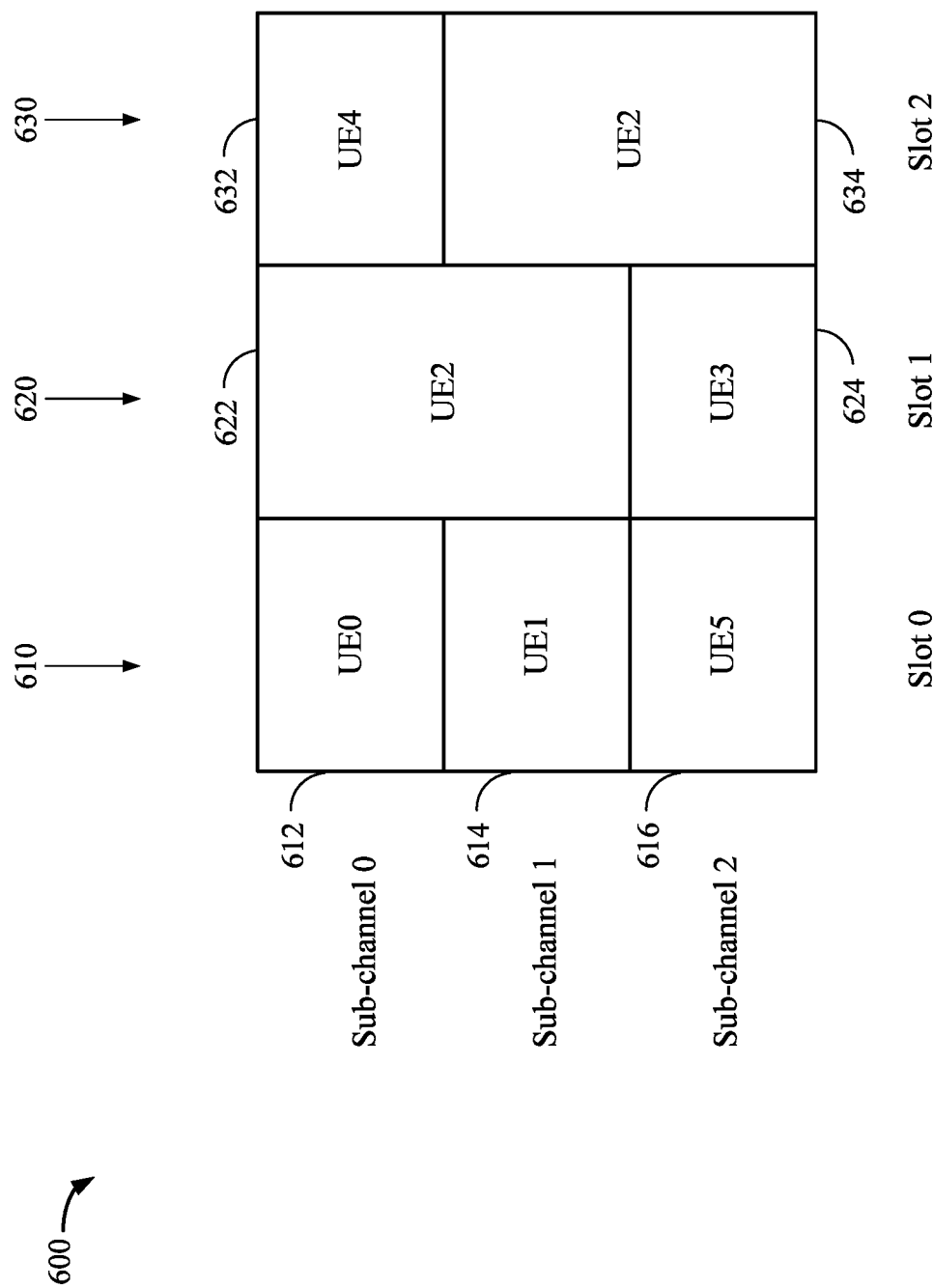
FIG. 6 is an example transmission timeline of sidelink, in accordance with certain aspects of the present disclosure.

FIG. 6 is an example transmission timeline 600 of sidelink communications (broadcast and groupcast device-to-device or D2D) between UEs (e.g., UEs 120, shown in FIG. 1). When a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UE0, UE1, and UE5, which transmit sidelink communications 612, 614, and 616 respectively, cannot receive the sidelink communications from each other. That is, UE0 cannot receive the sidelink transmissions 614 and 616. Similarly, UE2 cannot receive the sidelink transmissions 624 and 632 from UE3 and UE4, respectively. Also, UE3 cannot receive sidelink transmission 622 from UE2, and UE4 cannot receive the sidelink transmission 634 from UE2.

In aspects of the present disclosure, a sidelink transmission(s) that cannot be received may be referred to as being "erased" for the UE (or wireless node) that cannot receive the sidelink transmission because the UE (or wireless node) has no information regarding that sidelink transmission. This is unlike other scenarios where a UE may fail to decode a transmission, for in those scenarios, the UE may retain some information regarding the transmission that the UE failed to decode. The UE may combine that retained information with a retransmission that the UE receives to determine the transmission that the UE failed to decode.

Example Sidelink Resources for Sidelink Communications

Figure 7A:
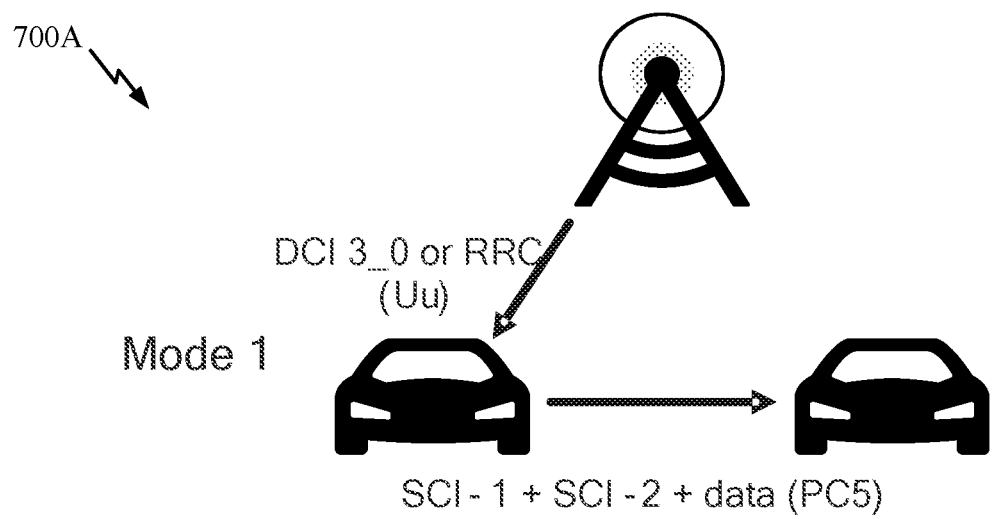
FIGS. 7A and 7B illustrate two modes of sidelink communication, in accordance with certain aspects of the present disclosure.
Figure 7B:
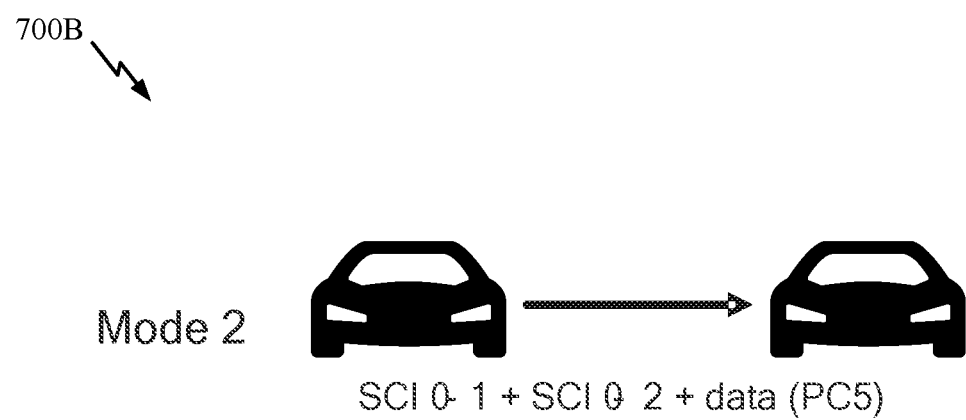

In New Radio (NR), there are generally two basic sidelink resource allocation modes. FIGS. 7A and 7B illustrate two modes of sidelink communication, in accordance with certain aspects of the present disclosure. Receiver (RX) user equipment (UE) behavior may be the same for both sidelink resource allocation modes.

According to a first mode, Mode 1, as shown in FIG. 7A, a base station (BS) may allocate sidelink resources for sidelink communication between UEs. For example, a BS may transmit downlink control information (e.g., DCI 3_0) to allocate time and frequency resources and indicate transmission timing. A modulation and coding scheme (MCS) may be determined by a UE within the limit set by the BS.

According to a second mode, Mode 2, as shown in FIG. 7B, UEs may determine the sidelink resources (the BS does not schedule sidelink transmission resources within sidelink resources configured by BS/network). In this case, UEs may autonomously select sidelink resources for transmission (following some rules in the NR standard). A UE may assist in sidelink resource selection for other UEs. A UE may be configured with an NR configured grant for sidelink transmission, and the UE may schedule sidelink transmissions for other UEs.

Figure 8:
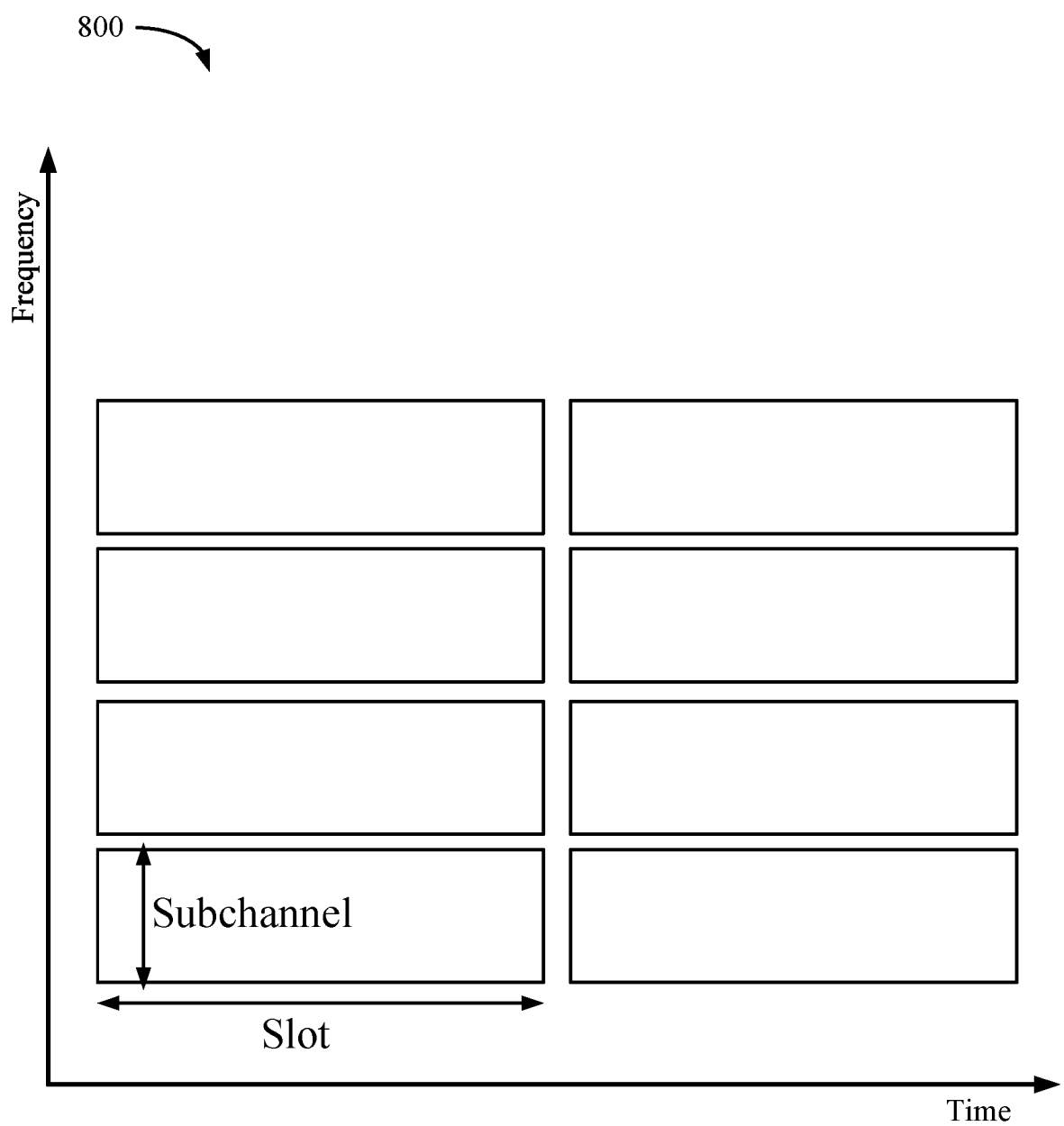
FIG. 8 is a diagram illustrating an example resource pool having physical resource blocks (PRBs) available for sidelink communication, in accordance with certain aspects of the present disclosure.

FIG. 8 illustrates an example sidelink resource pool 800 for sidelink communication, in accordance with certain aspects of the present disclosure. As illustrated in FIG. 8, the sidelink resource pool 800 may be partitioned into a variable number of sub-channels and slots (e.g., the minimum resource allocation unit in the frequency domain and the time domain, respectively). The sub-channels may include a consecutive set of physical resource blocks (PRBs) spanning different frequencies. Conventional sub-channel sizes may be (pre)configured, for example, to one of a set of possible sizes, such as: {10, 15, 20, 25, 50, 75, 100} PRBs.

According to previously-known techniques, resource allocation may be reservation based in NR sidelink communications. More specifically, resource allocations may be made in units of sub-channels in the frequency domain and may be limited to one slot in the time domain. A transmission may reserve resources in the current slot and in up to two future slots. Reservation information may be carried in sidelink control information (SCI). Sidelink control information (SCI) may be transmitted in two stages. A first stage SCI (SCI-1) may be transmitted on a physical sidelink control channel (PSCCH) and may contain resource reservation information as well as information needed to decode a second stage SCI (SCI-2). A SCI-2 may be transmitted on the physical sidelink shared channel (PSSCH) and may contain information needed to decode data on the shared channel (SCH) and to provide feedback (e.g., acknowledgments (ACKs) or negative acknowledgments (NACKs)) over a physical sidelink feedback channel (PSFCH)).

Figure 9:
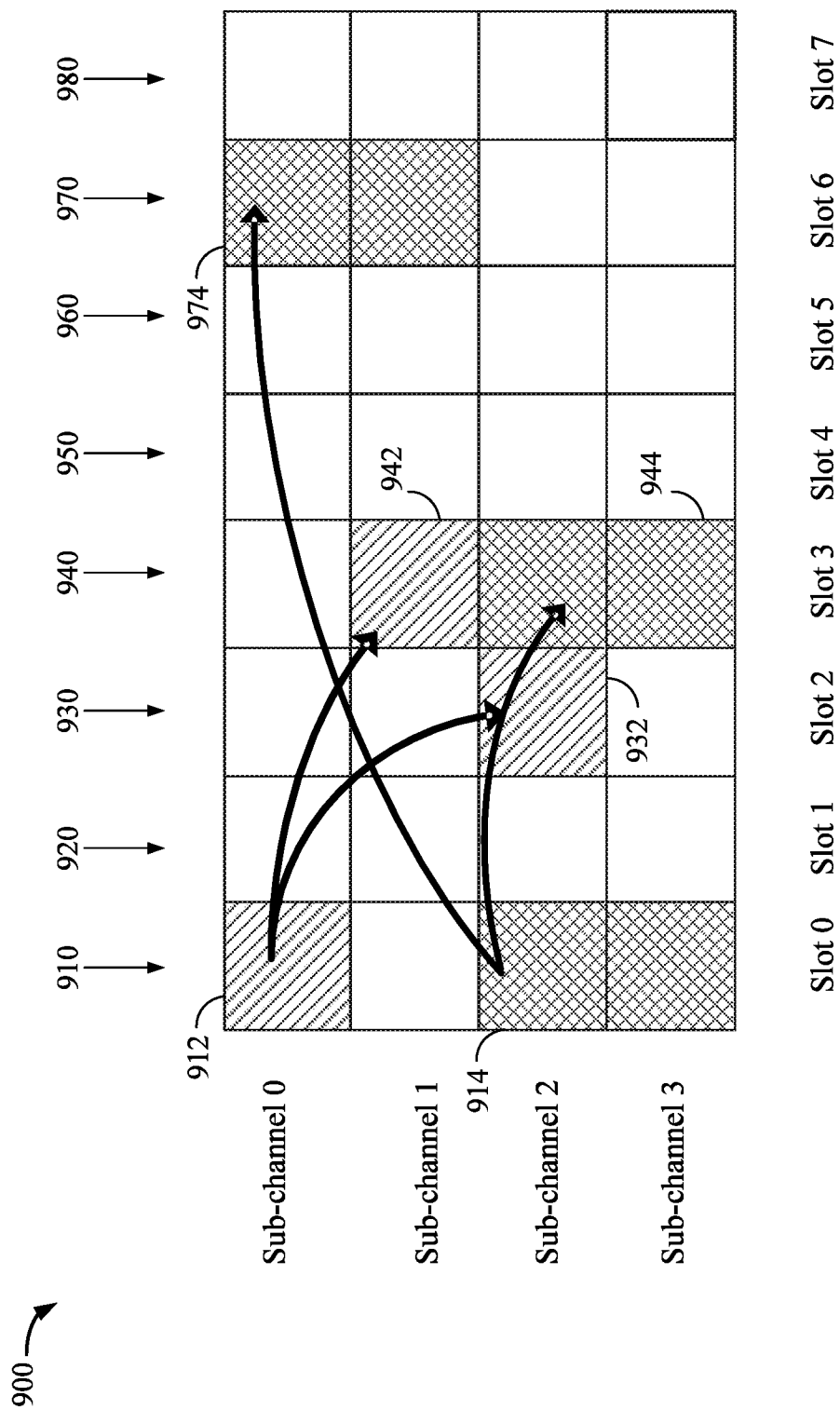
FIG. 9 illustrates an example transmission timeline illustrating sidelink resource reservation, according to previously known techniques.

FIG. 9 is an example transmission timeline 900 illustrating sidelink resource reservation, according to previously-known techniques. A SCI-1 transmitted by a UE at 912 may reserve resources at 912, 932, and 942. Similarly, another SCI-1 transmitted by a UE at 914 may reserve resources at 914, 944 and 974.

Example Techniques for Using Physical Resource Blocks (PRBs) of a Sidelink Resource Pool Aspects of the present disclosure provide apparatus, methods, processing systems, and computer readable mediums for using frequency resources of a sidelink resource pool that, in some cases, might otherwise go unused. For example, the techniques presented herein may utilize physical resource blocks (PRBs) of a sidelink resource block (RB) that are not assigned to a sidelink sub-channel (or are assigned to a special sub-channel).

As noted above, sidelink communications utilize sub-channels assigned frequency and time slots in resource pools. In 3GPP Release 16, it was agreed that the number of PRBs assigned to a resource pool may be any number of PRBs in the sidelink bandwidth part (BWP), even when the number of PRBs assigned to the resource pool is not a multiple of the sub-channel size.

Figure 10A:
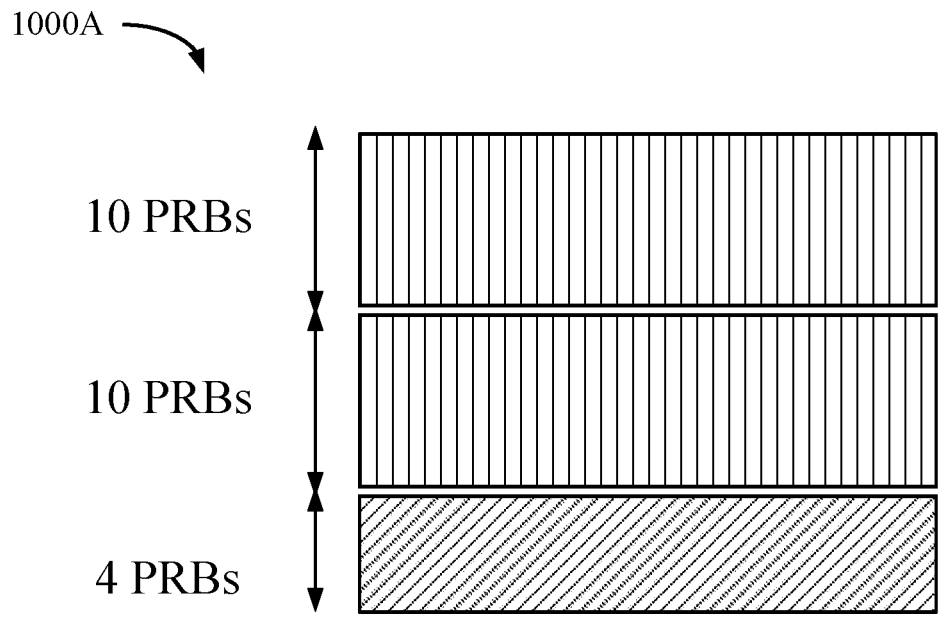
FIGS. 10A and 10B are diagrams illustrating example sub-channels in resource pool available for sidelink communication, in accordance with certain aspects of the present disclosure.
Figure 10B:
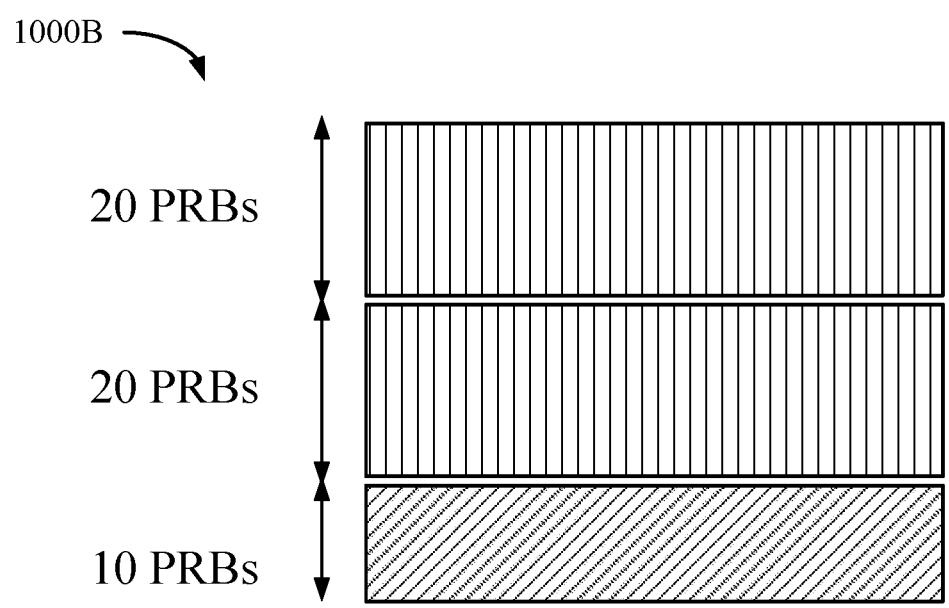

FIGS. 10A and 10B illustrate examples with sub-channel sizes of 10 PRBs and 20 PRBs, respectively. As shown in FIG. 10A, a resource pool may be configured with 24 PRBs in total and have a sub-channel size of 10 PRBs. This results in two sub-channels of 10 PRBs each and 4 unused PRBs. As another example, as shown in FIG. 10B, a resource pool may be configured with 50 PRBs in total and have a sub-channel size of 20 PRBs. This results in two sub-channels of 20 PRBs each and 10 unused PRBs. Aspects of the present disclosure provide techniques for utilizing these unused PRBs.

Figure 11B:
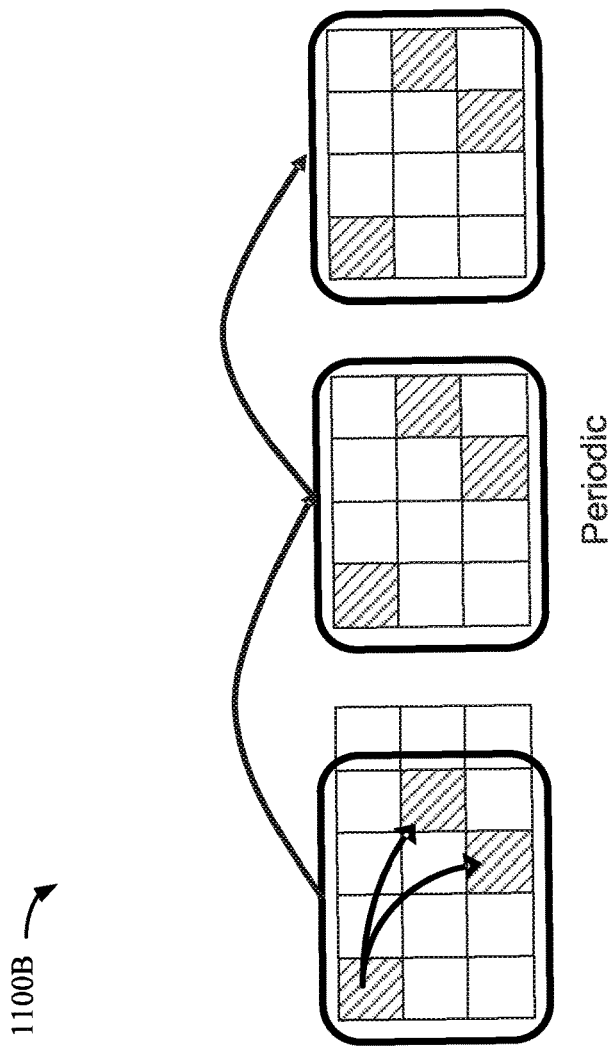
FIGS. 11A and 11B are exemplary transmission timelines illustrating resource reservations in sidelink communications, in accordance with certain aspects of the present disclosure.
Figure 11A:
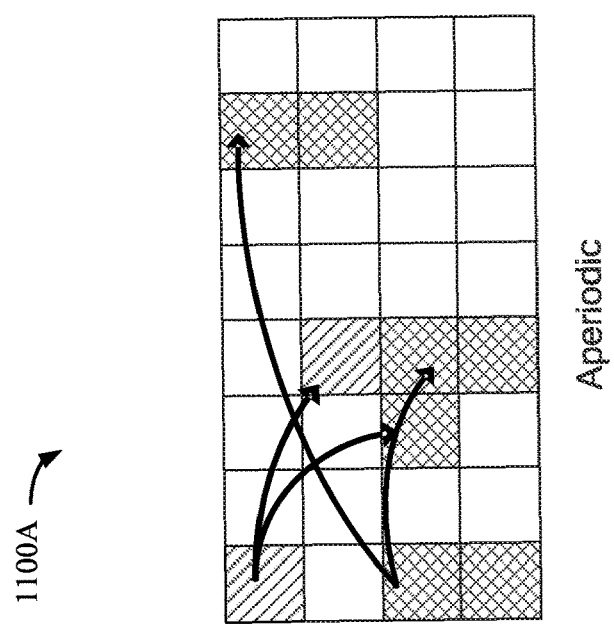

FIGS. 11A and 11B are exemplary transmission timelines illustrating resource reservations in sidelink communications, in accordance with certain aspects of the present disclosure.

Resource allocation may be reservation based in NR sidelink and more specifically, resource allocation may be, in units of sub-channels in the frequency domain and limited to one slot in the time domain.

A UE may want to reserve resources in the current slot and in up to two future slots. Reservation information may be carried in sidelink control information (SCI). Reservations may be made in a window of 32 logical slots.

As illustrated in FIGS. 11A and 11B, aperiodic and periodic resource reservations may be supported. For periodic resource reservations, a period, with configurable values between 0 milliseconds (ms) and 1000 ms, may be signaled in SCI. The example of FIG. 11B illustrates periodic resource reservation of 1 sub-channel in three different slots, within a given period. Periodic resource reservation and signaling may be disabled by (pre)configuration.

Figure 12:
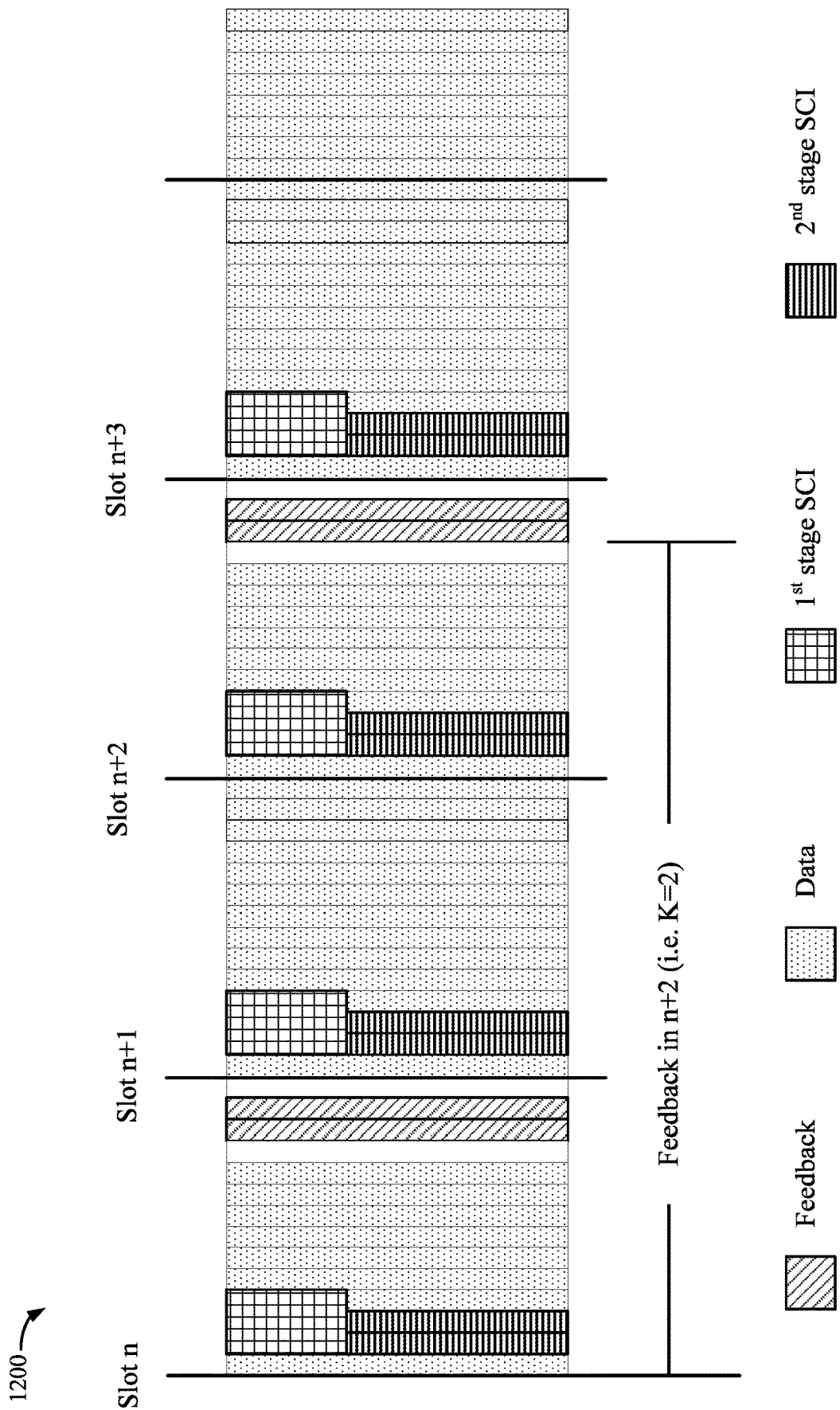
FIG. 12 is an example transmission timeline illustrating a physical sidelink feedback channel (PSFCH), in accordance with certain aspects of the present disclosure.

FIG. 12 is an example transmission timeline 1200 illustrating a physical sidelink feedback channel (PSFCH), in accordance with certain aspects of the present disclosure.

As illustrated in FIG. 12, feedback resources for sidelink communications (e.g., PSFCH) are typically system wide. PSFCH may be (pre)configured, for example, with a period of a number of slots N (e.g., N={1, 2, 4} slots). As illustrated in FIG. 12, three orthogonal frequency division multiplex (OFDM) symbols may be occupied if PSFCH is configured as 1 gap and 2 PSFCH symbols. The number of PRBs for the actual PSFCH may be (pre)configured (e.g., with a bitmap that indicates which PRBs of the system bandwidth are used for PSFCH).

PSFCH may be used to convey various types of feedback. For example, physical uplink control channel (PUCCH) Format 0 on one RB may carry hybrid automatic repeat request (HARM) acknowledgment (HARQ-ACK) information for a single physical sidelink shared channel (PSSCH) transmission. The PSFCH Format 0 sequence may be repeated on two PSFCH symbols. As illustrated in FIG. 12, the remaining resources (not used for $1^{st}$ stage SCI, $2^{nd}$ stage SCI, or PSFCH) may be available for data transmission (PSSCH transmissions).

Figure 13:
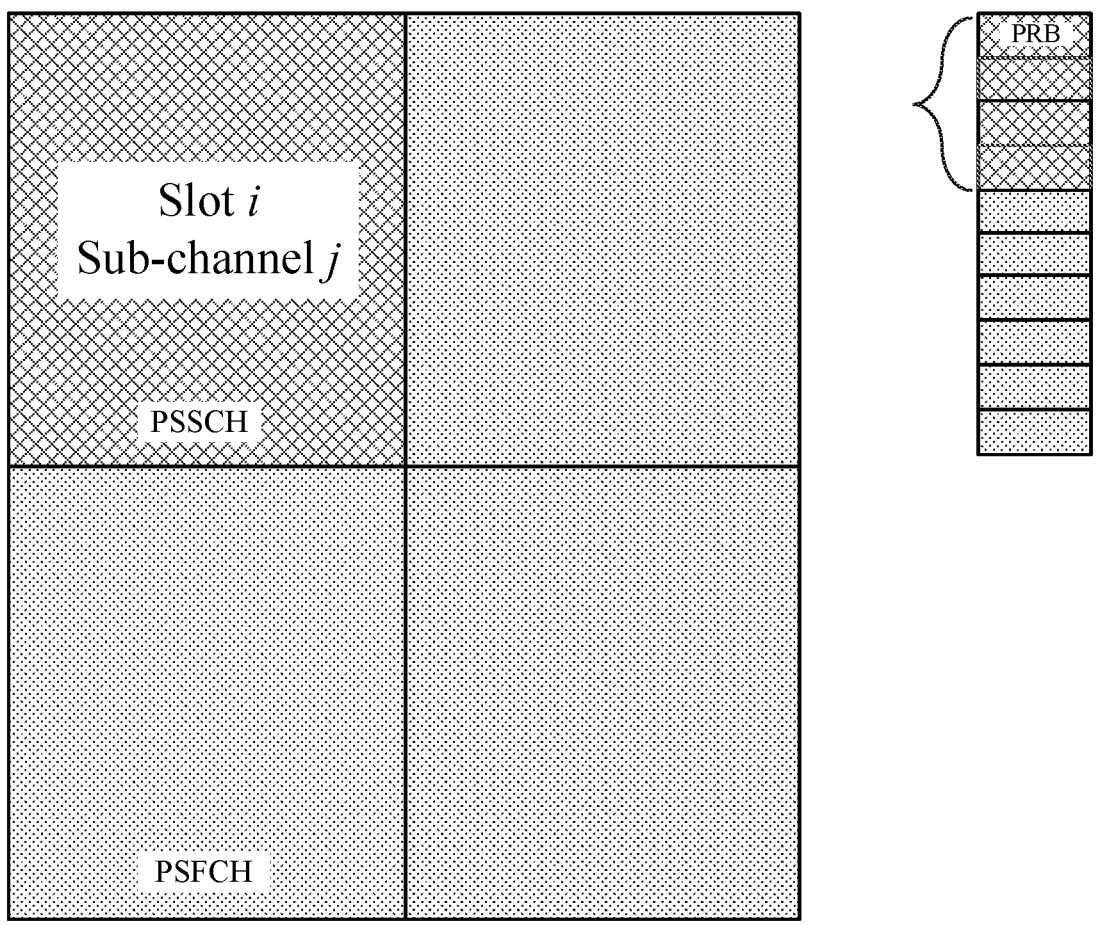
FIG. 13 is an example diagram of resource mapping between the PSFCH and a physical sidelink shared channel (PSSCH), in accordance with certain aspects of the present disclosure.

FIG. 13 is an example diagram 1300 illustrating resource mapping between PSFCH and PSSCH resources. The illustrated example shows how a PSSCH sent on sub-channel j, in slot i, maps to a set of 4 PRBs of the PSFCH resources. The actual mapping between PSSCH and the corresponding PSFCH resources, may be based on the starting sub-channel of PSSCH, the slot containing PSSCH, the source ID, or the destination ID. In sidelink communications, a UE determines a PSFCH resource for a PSFCH transmission in response to a PSSCH reception. Implicit mapping of resources for feedback transmissions (PSFCH) may help avoid collisions between transmissions.

As noted above, aspects of the present disclosure provide techniques for using PRBs that are not assigned to a sidelink sub-channel or are assigned to a special sidelink sub-channel. As will be described in greater detail below, the techniques described herein may allow a UE to use unused portions of a sidelink resource pool (e.g., the four unused PRBs of FIG. 10A or the 10 unused PRBs of FIG. 10B) or use PRBs of the sidelink resource pool assigned to a special sub-channel for various purposes. For example, the PRBs may be used as additional PSFCH resources.

Figure 14:
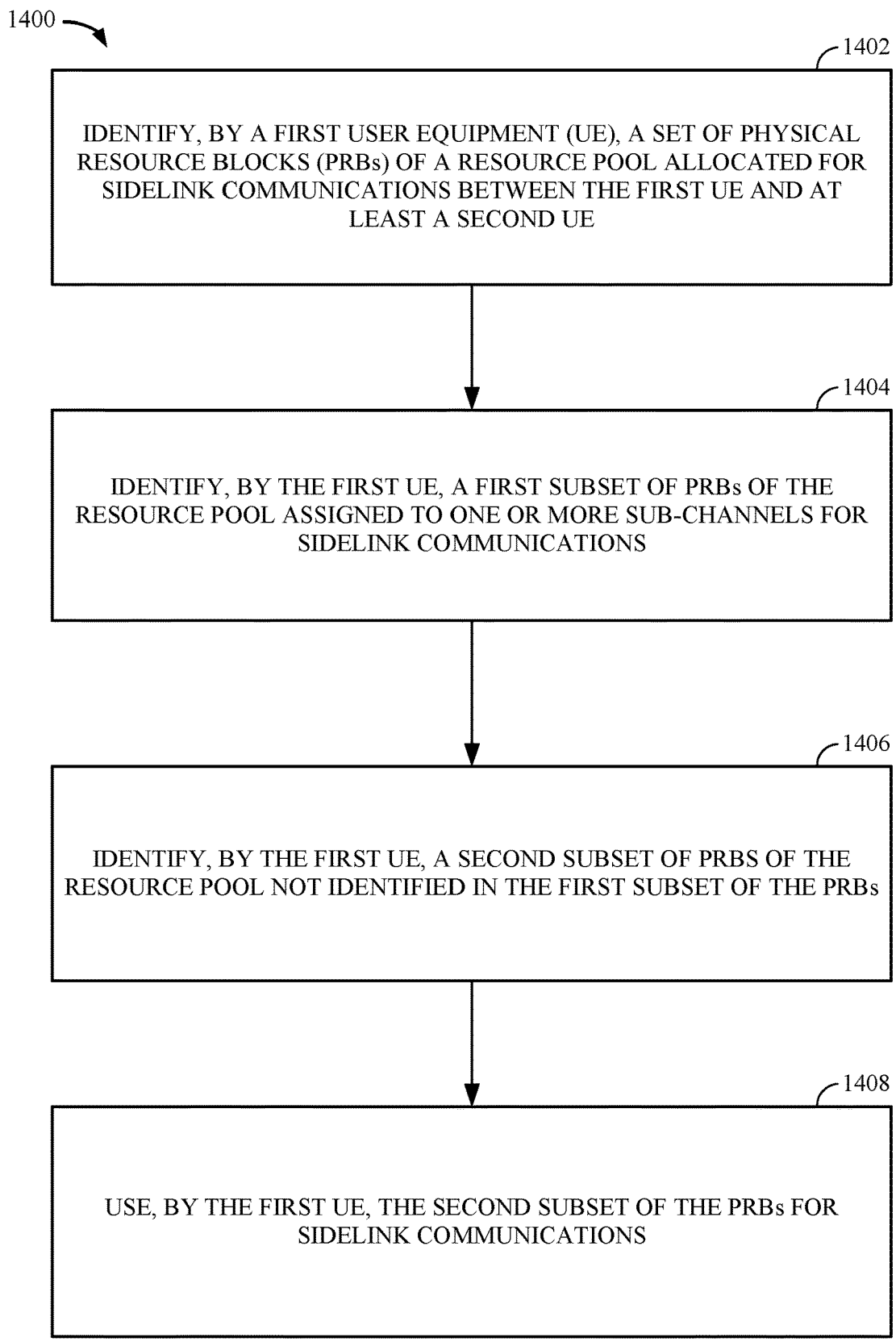
FIG. 14 illustrates example operations for wireless communications by a first UE, in accordance with certain aspects of the present disclosure.

FIG. 14 is a flow diagram illustrating example operations 1400 for wireless communication by a first UE, in accordance with certain aspects of the present disclosure. The operations 1400 may be performed, for example, by a first UE (e.g., UE 120a or 120b of FIG. 1 or UE 120a of FIG. 4) to utilize unassigned PRBs of a sidelink resource pool for sidelink communications with a second UE. The operations 1400 may be implemented as software components that are executed and run on one or more processors (e.g., controller/processor 480 of FIG. 4). Further, the transmission and reception of signals by the first UE in operations 1400 may be enabled, for example, by one or more antennas (e.g., antennas 452 of FIG. 4). In certain aspects, the transmission and/or reception of signals by the first UE may be implemented via a bus interface of one or more processors (e.g., controller/processor 480 of FIG. 4) obtaining and/or outputting signals.

The operations 1400 begin, in block 1402, by a first UE identifying a set of PRBs of a resource pool allocated for sidelink communications between the first UE and at least a second UE. For example, referring back to FIG. 10A or 10B, a resource pool may have 24 PRBs or 50 PRBs. In other cases, the resource pool may include a different integer number of PRBs.

In block 1404, the UE identifies a first subset of PRBs of the resource pool assigned to one or more sub-channels for sidelink communications. For example, in FIG. 10A, 20 PRBs of the 24 total PRBs are assigned to two 10 PRB sub-channels, while 40 PRBs of the 50 total PRBs are assigned to two 20 PRB sub-channels in FIG. 10B. In other situations, the sub-channel may occupy a different integer number of PRBs.

In block 1406, the UE identifies a second subset of PRBs of the resource pool not identified in the first subset. For example, in FIG. 10A, a remainder of 4 PRBs are not identified in the first subset of PRBs because they are not assigned to any sub-channel, while a remainder of 10 PRBs are not identified in the first subset of PRBs because they are not assigned to any sub-channel in FIG. 10B. In other situations, the second subset of PRBs may be the remainder PRBs not sufficient to form another sub-channel (i.e., a number of PRBs less than the integer number of sub-channel PRBs). In some other examples, the second subset of PRBs may be assigned to a sub-channel not among the sub-channels associated with the first subset of PRBs. For example, the different sub-channel may occupy a different integer number of PRBs than those of the sub-channel of the first subset of PRBs.

In block 1408, the UE utilizes the second subset of the PRBs for sidelink communications. This second subset of PRBs (the remaining or unassigned PRBs or PRBs assigned to a special sub-channel) may be used for various purposes, as further discussed in the aspects and examples below.

In one particular aspect, the remainder or unassigned portion of PRBs (or PRBs in the resource pool assigned to a special sub-channel) may be used to convey inter-UE coordination information. The inter-UE coordination information may indicate at least one of one or more resource collisions, one or more occupied resources (e.g., non-preferred resources), or one or more available resources (e.g., preferred resources). The inter-UE coordination information may be conveyed as a payload of a packet structure sent in the remainder or unassigned portion of the PRBs or via a sequence-based transmission. Different sequences may be used to convey different inter-UE coordination information.

Inter-UE coordination information may help to avoid collisions between transmissions when a UE misses a transmission in a half-duplex operation (where a UE cannot receive and transmit simultaneously) or where the UE was unable to decode a transmission. Inter-UE coordination information may help the UE recover missed data, or, at the very least, help the UE to know what resources are reserved (e.g., occupied or non-preferred) so that the UE may avoid using those resources.

In a second particular aspect, the remainder or unassigned portion of PRBs (or PRBs in the resource pool assigned to a special sub-channel) may be used to convey control information. For example, the control information may indicate at least one of a scheduling request (SR), a buffer status report (BSR), a channel state information (CSI) report, or a codeblock group (CBG) based acknowledgment (ACK) feedback.

Figure 15:
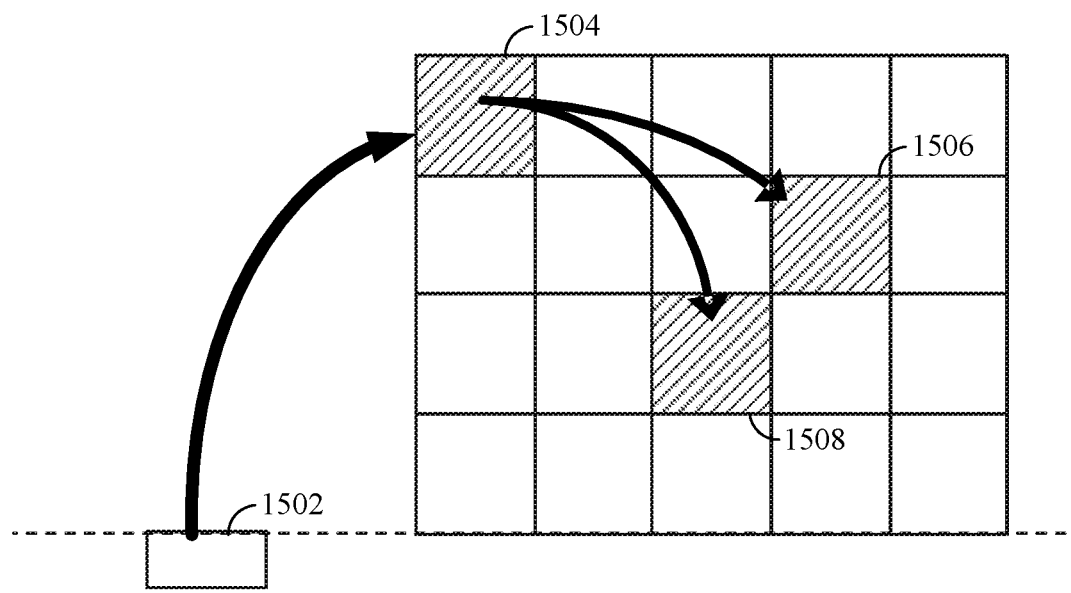
FIG. 15 illustrates an example diagram of using the remaining PRBs for reservation, in accordance with certain aspects of the present disclosure.

As illustrated in FIG. 15, in some cases, the control information may indicate a reservation of future resources. The control information, with or without data, may indicate a reservation of one or more future resources. As shown in FIG. 15, the control information (or reservation signaling)

1502 may reserve at least the first resource 1504. The first resource 1504 may reserve future resources 1506 and 1508.

The control information may be conveyed via a physical layer (PHY) channel on the remainder or unassigned portion of PRBs. In some implementations, the PHY channel may be a new PHY channel. In some cases, if no data is transmitted, $1^{st}$ stage SCI (SCI-1) and $2^{nd}$ stage SCI (SCI-2) may be transmitted. Alternatively, the control information may be sequence based.

In a third particular aspect, the remainder or unassigned portion of PRBs (or PRBs in the resource pool assigned to a special sub-channel) may be used to convey wake-up or paging signaling. For example, the UE may monitor a limited bandwidth associated with the remainder or unassigned portion of PRBs for the wake-up or paging signaling. This may allow the UE to save power without attending to the full bandwidth. Where a wake-up or paging signaling is detected, the UE may respond by monitoring a larger bandwidth associated with the first subset of PRBs. In some cases, the UE may switch to full bandwidth monitoring for a defined period of time upon receiving the wake-up or paging signaling. In some aspects, the wake-up or paging signaling may indicate one or more occupied resources (e.g., non-preferred resources) or one or more available resources (e.g., preferred resources).

Figure 16:
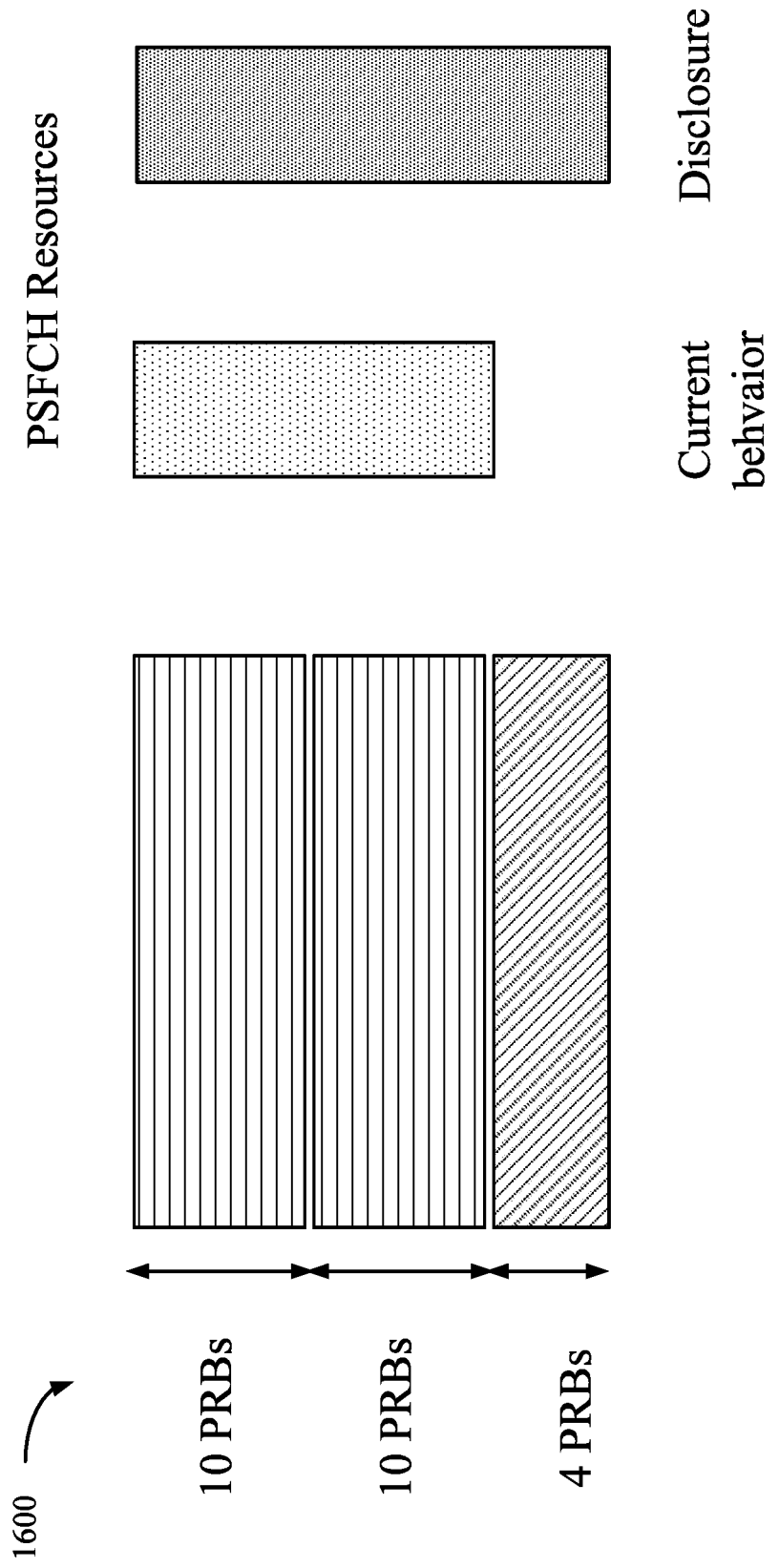
FIG. 16 illustrates an example diagram comparing PSFCH resources utilization between existing behavior and the behavior according to the present disclosure, in accordance with certain aspects of the present disclosure.

In a fourth particular aspect, the remainder or unassigned portion of PRBs (or PRBs in the resource pool assigned to a special sub-channel) may be used as PSFCH resources without physical sidelink control channel (PSCCH) or PSSCH. For example, FIG. 16 illustrates a comparison 1600 comparing PSFCH resource usage between existing behavior where the remainder or unassigned portion of PRBs are not used (on the left in FIG. 16) and when the remainder or unassigned portion of PRBs are used as PSFCH resources (on the right in FIG. 16). As shown, the four remainder PRBs may be used as additional PSFCH resources on top of the 20 PRBs used as PSFCH resources. That is, the four remainder PRBs may include PSFCH with data (e.g., PSCCH or PSSCH), or alternatively, the four remainder PRBs may include PSFCH without data.

Example Wireless Communication Devices

Figure 17:
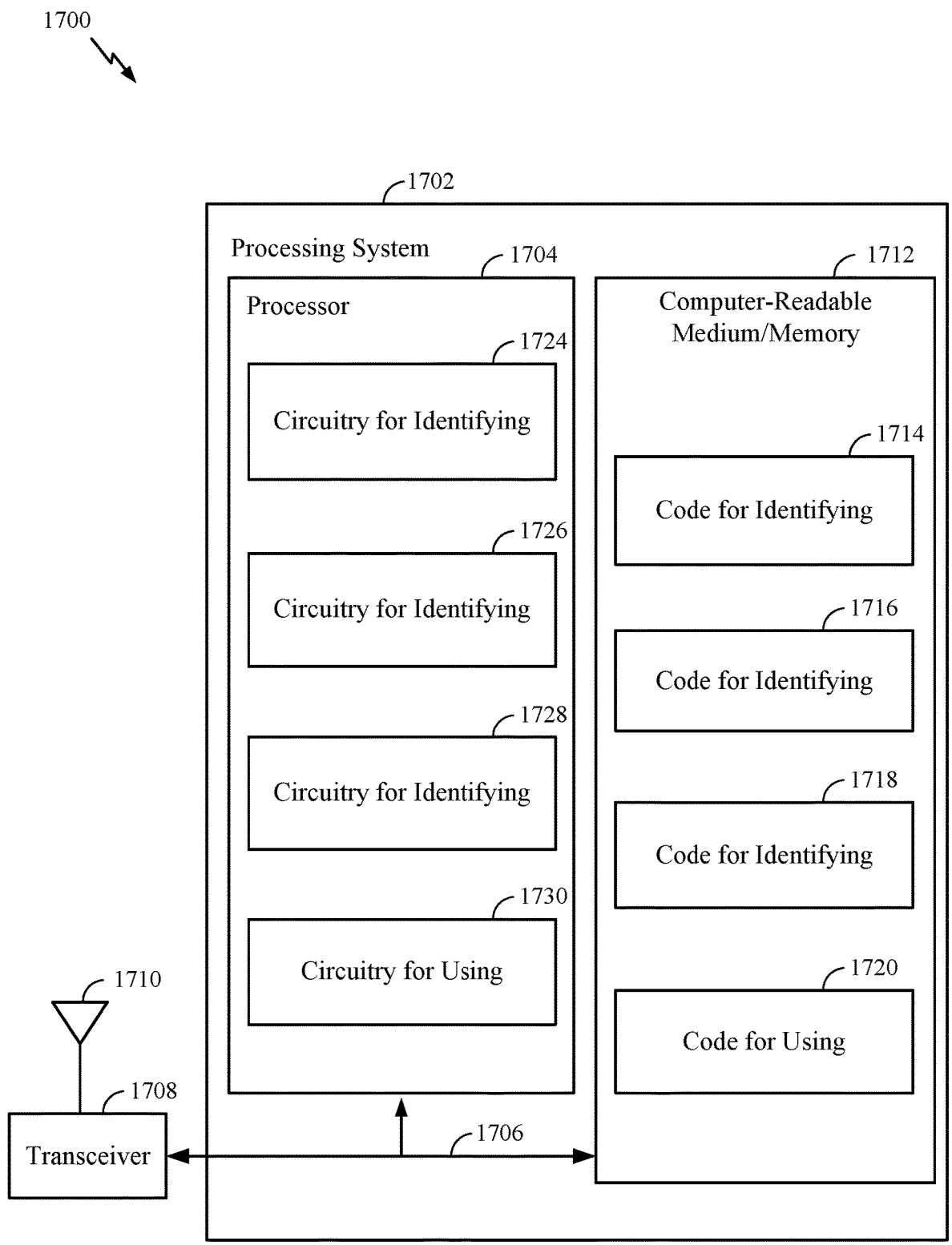
FIG. 17 illustrates a communications device that may include various components configured to perform the operations illustrated in FIG. 14, in accordance with certain aspects of the present disclosure.

FIG. 17 illustrates a communications device 1700 that may include various components (e.g., corresponding to means-plus-function components) configured to perform operations for the techniques disclosed herein, such as the operations 1400 illustrated in FIG. 14.

Communications device 1700 includes a processing system 1702 coupled to a transceiver 1708 (e.g., a transmitter and/or a receiver). Transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

Processing system 1702 includes a processor 1704 coupled to a computer-readable medium/memory 1712 via a bus 1706. In certain aspects, computer-readable medium/memory 1712 is configured to store instructions (e.g., computer-executable code) that when executed by the processor 1704, cause the processor 1704 to perform the operations 1400 illustrated in FIG. 14, or other operations for recovering a sidelink communication that is missed by a wireless node due to the wireless node transmitting while the sidelink communication is occurring. In certain aspects, the processor 1704 can include one or more components of UE 120a with reference to FIG. 4 such as, for example, controller/processor 480, transmit processor 464, receive processor 458, and/or the like. Additionally, in certain aspects, computer-readable medium 1712 can include one or more components of UE 120a with reference to FIG. 4 such as, for example, memory 482 and/or the like.

In certain aspects, computer-readable medium/memory 1712 stores code 1714 for identifying; code 1716 for identifying; code 1718 for identifying; and code 1720 for using.

In some cases, code 1714 for identifying may include code for identifying a set of physical resource blocks (PRBs) of a resource pool allocated for sidelink communications between the first UE and at least a second UE.

In some cases, code 1716 for identifying may include code for identifying a first subset of PRBs of the resource pool assigned to one or more sub-channels for sidelink communications.

In some cases, code 1718 for identifying may include code for identifying a second subset of PRBs of the resource pool not identified in the first subset of PRBs.

In some cases, code 1720 for identifying may include code for using the second subset of the PRBs for sidelink communications.

In certain aspects, the processor 1704 has circuitry configured to implement the code stored in the computer-readable medium/memory 1712. The processor 1704 includes circuitry 1724 for identifying; circuitry 1726 for identifying; circuitry 1728 for identifying; and circuitry 1730 for using.

In some cases, circuitry 1724 for identifying may include circuitry for identifying a set of PRBs of a resource pool allocated for sidelink communications between the first UE and at least a second UE.

In some cases, circuitry 1726 for identifying may include circuitry for identifying a first subset of PRBs of the resource pool assigned to one or more sub-channels for sidelink communications.

In some cases, circuitry 1728 for identifying may include circuitry for identifying a second subset of PRBs of the resource pool not identified in the first subset of PRBs.

In some cases, circuitry 1730 for identifying may include circuitry for using the second subset of the PRBs for sidelink communications.

In some cases, the operations illustrated in FIG. 14, as well as other operations described herein, may be implemented by one or more means-plus-function components.

For example, in some cases, such operations may be implemented by means for identifying and means for using.

In some cases, means for identifying and means for using, includes a processing system, which may include one or more processors, such as the receive processor 458, the transmit processor 464, the TX MIMO processor 466, and/or the controller/processor 480 of the UE 120a illustrated in FIG. 4 and/or the processing system 1702 of the communication device 1700 in FIG. 17.

The transceiver 1708 may provide a means for receiving or transmitting information such as packets, user data, or control information associated with various information channels (e.g., control channels, data channels, and information related to SR, etc.). Information may be passed on to other components of the communications device 1700. The transceiver 1708 may be an example of aspects of the transceiver 454 described with reference to FIG. 4. The antenna 1710 may correspond to a single antenna or a set of antennas. The transceiver 1708 may provide means for transmitting signals generated by other components of the communications device 1700.

The sidelink manager 122 or 124 may support wireless communication in accordance with examples as disclosed herein.

The sidelink manager 122 or 124 may be an example of means for performing various aspects described herein. The sidelink manager 122 or 124, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the sidelink manager 122 or 124, or its sub-components, may be implemented in code (e.g., as configuration management software or firmware) executed by a processor, or any combination thereof. If implemented in code executed by a processor, the functions of the sidelink manager 122 or 124, or its sub-components may be executed by a general-purpose processor, a DSP, an ASIC, a FPGA or other programmable logic device.

In some examples, the sidelink manager 122 or 124 may be configured to perform various operations (e.g., receiving, determining, transmitting) using or otherwise in cooperation with the transceiver 1708.

The sidelink manager 122 or 124, or its sub-components, may be physically located at various positions, including being distributed such that portions of functions are implemented at different physical locations by one or more physical components. In some examples, the sidelink manager 122 or 124, or its sub-components, may be a separate and distinct component in accordance with various aspects of the present disclosure. In some examples, the sidelink manager 122 or 124, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a first user equipment (UE), comprising: identifying a set of physical resource blocks (PRBs) of a resource pool allocated for sidelink communications between the first UE and at least a second UE; identifying a first subset of PRBs of the resource pool assigned to one or more sub-channels for sidelink communications; identifying a second subset of PRBs of the resource pool not identified in the first subset of the PRBs; and using the second subset of the PRBs for sidelink communications.

Clause 2: The method of Clause 1, further comprising receiving signaling indicating a sub-channel size in terms of a number of PRBs.

Clause 3: The method of Clause 2, wherein a size of the second subset of the PRBs depends on a size of the resource pool and the sub-channel size.

Clause 4: The method of any of Clauses 1-3, wherein the second subset of PRBs is used to convey inter-UE coordination information.

Clause 5: The method of Clause 4, wherein the inter-UE coordination information indicates one or more resource collisions.

Clause 6: The method of Clause 4 or 5, wherein the inter-UE coordination information indicates one or more occupied resources or one or more available resources.

Clause 7: The method of any of Clauses 4-6, wherein the inter-UE coordination information is conveyed as a payload of a packet structure sent in the second subset of PRBs.

Clause 8: The method of any of Clauses 4-7, wherein the inter-UE coordination information is conveyed via a sequence-based transmission, wherein different sequences are used to convey different inter-UE coordination information.

Clause 9: The method of any of Clauses 1-8, wherein the second subset of PRBs is used to convey control information.

Clause 10: The method of Clause 9, wherein the control information indicates a scheduling request (SR).

Clause 11: The method of Clause 9 or 10, wherein the control information indicates a buffer status report (BSR).

Clause 12: The method of any of Clauses 9-11, wherein the control information indicates a channel state information (CSI) report.

Clause 13: The method of any of Clauses 9-12, wherein the control information indicates codeblock group (CBG) based acknowledgment (ACK) feedback.

Clause 14: The method of any of Clauses 9-13, wherein the control information indicates a reservation of future resources.

Clause 15: The method of Clause 14, wherein the control information is transmitted with or without data.

Clause 16: The method of any of Clauses 9-15, wherein the control information is conveyed via a physical layer (PHY) channel on the second subset of PRB s.

Clause 17: The method of any of Clauses 1-16, wherein the second subset of PRBs is used to convey wake-up or paging signaling.

Clause 18: The method of Clause 17, further comprising: monitoring a limited bandwidth associated with the second subset of PRBs for the wake-up or paging signaling; and if the wake-up or paging signaling is detected, monitoring a larger bandwidth associated with the first subset of PRBs.

Clause 19: The method of Clause 17 or 18, wherein the wake-up or paging signaling indicates one or more occupied resources or one or more available resources.

Clause 20: The method of any of Clauses 1-19, wherein the second subset of PRBs is used as physical sidelink feedback channel (PSFCH) resources.

Clause 21: The method of Clause 20, wherein the PSFCH resources comprise PSFCH resources without physical sidelink control channel (PSCCH) or physical sidelink shared channel (PSSCH).

Clause 22: The method of Clause 20 or 21, wherein the second subset of PRBs is used as PSFCH resources in addition to PSFCH resources in the first subset of PRBs.

Clause 23: The method of Clause 22, wherein the PSFCH resources in the second subset of PRBs is in the same orthogonal frequency division multiplex (OFDM) symbols as the PSFCH resources in the first subset of PRBs.

Clause 24: An apparatus for wireless communication by a first user equipment (UE), comprising: at least one processor; and a memory coupled to the at least one processor, the memory including instructions executable by the at least one processor to cause the apparatus to: identify a set of physical resource blocks (PRBs) of a resource pool allocated for sidelink communications between the first UE and at least a second UE; identify a first subset of PRBs of the resource pool assigned to one or more sub-channels for sidelink communications; identify a second subset of PRBs of the resource pool not identified in the first subset of the PRBs; and use the second subset of the PRBs for sidelink communications.

Clause 25: The apparatus of Clause 24, wherein the second subset of PRBs is used to convey inter-UE coordination information.

Clause 26: The apparatus of Clause 24 or 25, wherein the second subset of PRBs is used to convey control information.

Clause 27: The apparatus of any of Clauses 24-26, wherein the second subset of PRBs is used to convey wake-up or paging signaling.

Clause 28: The apparatus of any of Clauses 24-27, wherein the second subset of PRBs is used as physical sidelink feedback channel (PSFCH) resources without physical sidelink control channel (PSCCH) or physical sidelink shared channel (PSSCH).

Clause 29: An apparatus for wireless communication by a first user equipment (UE), comprising: means for identifying a set of physical resource blocks (PRBs) of a resource pool allocated for sidelink communications between the first UE and at least a second UE; means for identifying a first subset of PRBs of the resource pool assigned to one or more sub-channels for sidelink communications; means for identifying a second subset of PRBs of the resource pool not identified in the first subset of the PRBs; and means for using the second subset of the PRBs for sidelink communications.

Clause 30: A computer readable medium having instructions stored thereon for: identifying, by a first user equipment (UE), a set of physical resource blocks (PRBs) of a resource pool allocated for sidelink communications between the first UE and at least a second UE; identifying a first subset of PRBs of the resource pool assigned to one or more sub-channels for sidelink communications; identifying a second subset of PRBs of the resource pool not identified in the first subset of the PRBs; and using the second subset of the PRBs for sidelink communications.

Additional Considerations

The preceding description provides examples of utilizing physical resource blocks (PRBs) that do not belong to a sub-channel in sidelink, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5g NR), 3GPP Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 14 may be performed by various processors shown in FIG. 4, such as processors 466, 458, 464, and/or controller/processor 480 of the UE 120a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first user equipment (UE), the method comprising:
 identifying a resource pool allocated for sidelink communications between the first UE and at least a second UE, wherein:
  the resource pool consists of a plurality of sub-channels and one more remaining physical resource blocks (PRBs);
  each of the plurality of sub-channels having a same number of PRBs equal to a sub-channel size;
  the number of PRBs comprises a plurality of PRBs; and
  a total number of the one or more remaining PRBs is fewer than the number of PRBs equal to the sub-channel size;
 communicating feedback on a physical sidelink feedback channel (PSFCH) on the plurality of sub-channels; and
 using the one or more remaining PRBs for sidelink communications.

2. The method of claim 1, further comprising receiving signaling indicating the sub-channel size.

3. The method of claim 1, wherein a number of the one or more remaining PRBs depends on a total number of PRBs of the resource pool and the sub-channel size.

4. The method of claim 1, wherein using the one or more remaining PRBs for sidelink communication comprises using the one or more remaining PRBs to convey inter-UE coordination information.

5. The method of claim 4, wherein the inter-UE coordination information indicates one or more resource collisions.

6. The method of claim 4, wherein the inter-UE coordination information indicates one or more occupied resources or one or more available resources.

7. The method of claim 4, wherein the inter-UE coordination information is conveyed as a payload of a packet structure sent in the one or more remaining PRBs.

8. The method of claim 4, wherein the inter-UE coordination information is conveyed via a sequence-based transmission, wherein different sequences are used to convey different inter-UE coordination information.

9. The method of claim 1, wherein using the one or more remaining PRBs for sidelink communication comprises using the one or more remaining PRBs to convey control information.

10. The method of claim 9, wherein the control information indicates a scheduling request (SR).

11. The method of claim 9, wherein the control information indicates a buffer status report (BSR).

12. The method of claim 9, wherein the control information indicates a channel state information (CSI) report.

13. The method of claim 9, wherein the control information indicates codeblock group (CBG) based acknowledgment (ACK) feedback.

14. The method of claim 9, wherein the control information indicates a reservation of future resources.

15. The method of claim 14, wherein the control information is transmitted with or without data.

16. The method of claim 9, wherein the control information is conveyed via a new physical layer (PHY) channel for sending control information on the one or more remaining PRBs.

17. The method of claim 1, wherein using the one or more remaining PRBs for sidelink communication comprises using the one or more remaining PRBs to convey wake-up or paging signaling.

18. The method of claim 17, further comprising:
 monitoring a limited bandwidth associated with the one or more remaining PRBs for the wake-up or paging signaling; and
 if the wake-up or paging signaling is detected, monitoring a larger bandwidth associated with the plurality of sub-channels.

19. The method of claim 17, wherein the wake-up or paging signaling indicates one or more occupied resources or one or more available resources.

20. The method of claim 1, wherein using the one or more remaining PRBs for sidelink communication comprises using the one or more remaining PRBs as additional resources to transmit the PSFCH.

21. The method of claim 20, wherein the PSFCH is communicated on resources of the plurality of sub-channels without a physical sidelink control channel (PSCCH) transmission or a physical sidelink shared channel (PSSCH) transmission.

22. The method of claim 1, wherein the PSFCH is communicated in the one or more remaining PRBs and in the plurality of sub-channels in the same orthogonal frequency division multiplex (OFDM) symbols.

23. An apparatus for wireless communication by a first user equipment (UE), the apparatus comprising:
one or more memories, individually or collectively, storing computer executable code; and
one or more processors coupled with the one or more memories and configured to, individually or collectively, execute the computer executable code and cause the apparatus to:
identify a resource pool allocated for sidelink communications between the first UE and at least a second UE, wherein:
the resource pool consists of a plurality of sub-channels and one more remaining physical resource blocks (PRBs);
each of the plurality of sub-channels having a same number of PRBs equal to a sub-channel size;
the number of PRBs comprises a plurality of PRBs; and
a total number of the one or more remaining PRBs is fewer than the number of PRBs equal to the sub-channel size;
communicate feedback on a physical sidelink feedback channel (PSFCH) on the plurality of sub-channels; and
use the one or more remaining PRBs for sidelink communications.

24. The apparatus of claim 23, wherein the one or more processors being configured to, individually or collectively, cause the apparatus to use the one or more remaining PRBs for sidelink communications comprises the one or more processors being configured to, individually or collectively, cause the apparatus to use the one or more remaining PRBs to convey inter-UE coordination information.

25. The apparatus of claim 23, wherein the one or more processors being configured to, individually or collectively, cause the apparatus to use the one or more remaining PRBs for sidelink communications comprises the one or more processors being configured to, individually or collectively, cause the apparatus to use the one or more remaining PRBs to convey control information.

26. The apparatus of claim 23, wherein the one or more processors being configured to, individually or collectively, cause the apparatus to use the one or more remaining PRBs for sidelink communications comprises the one or more processors being configured to, individually or collectively, cause the apparatus to use the one or more remaining PRBs to convey wake-up or paging signaling.

27. The apparatus of claim 23, wherein the one or more processors being configured to, individually or collectively, cause the apparatus to use the one or more remaining PRBs for sidelink communications comprises the one or more processors being configured to, individually or collectively, cause the apparatus to use the one or more remaining PRBs as additional resources to communicate the PSFCH, wherein the PSFCH is communicated on resources of the plurality of sub-channels without a physical sidelink control channel (PSCCH) or a physical sidelink shared channel (PSSCH).

28. An apparatus for wireless communication by a first user equipment (UE), the apparatus comprising:
means for identifying a resource pool allocated for sidelink communications between the first UE and at least a second UE, wherein:
the resource pool consists of a plurality of sub-channels and one more remaining physical resource blocks (PRBs);
each of the plurality of sub-channels having a same number of PRBs equal to a sub-channel size;
the number of PRBs comprises a plurality of PRBs; and
a total number of the one or more remaining PRBs is fewer than the number of PRBs equal to the sub-channel size;
means for communicating feedback on a physical sidelink feedback channel (PSFCH) on the plurality of sub-channels; and
means for using the one or more remaining PRBs for sidelink communications.

29. A non-transitory computer readable medium having computer executable instructions stored thereon to be executed by a computer for:
identifying a resource pool allocated for sidelink communications between a first user equipment (UE) and at least a second UE, wherein:
the resource pool consists of a plurality of sub-channels and one more remaining physical resource blocks (PRBs);
each of the plurality of sub-channels having a same number of PRBs equal to a sub-channel size;
the number of PRBs comprises a plurality of PRBs; and
a total number of the one or more remaining PRBs is fewer than the number of PRBs equal to the sub-channel size;
communicating feedback on a physical sidelink feedback channel (PSFCH) on the plurality of sub-channels; and
using the one or more remaining PRBs for sidelink communications.

30. The method of claim 1, wherein:
the communicating the feedback on the PSFCH on the plurality of sub-channels is in a slot; and
the using the one or more remaining PRBs for sidelink communications is in the slot.

* * * * *